United States Patent [19]

Schellinger

[11] Patent Number: 5,574,976
[45] Date of Patent: Nov. 12, 1996

[54] SYSTEM FOR SCANNING CHANNELS

[75] Inventor: Michael J. Schellinger, Vernon Hills, Ill.

[73] Assignee: Motorola, Inc., Schaumburg, Ill.

[21] Appl. No.: 239,019

[22] Filed: May 6, 1994

[51] Int. Cl.[6] ........................................ H04B 1/00
[52] U.S. Cl. .................. 455/54.1; 455/33.1; 455/34.1; 455/34.2; 455/56.1; 379/58; 379/61
[58] Field of Search .......................... 455/31.1, 32.1, 455/161.1, 33.1, 54.1, 34.1, 34.2, 38.1, 56.1, 54.2, 53.1, 58.1, 69, 70, 38.3, 343, 38.2; 370/95.1, 95.2, 95.3; 379/58, 63, 61, 59

[56] References Cited

U.S. PATENT DOCUMENTS

| | | | |
|---|---|---|---|
| 4,723,264 | 2/1988 | Sasuta et al. | 379/58 |
| 4,882,765 | 11/1989 | Maxwell et al. | 455/18 |
| 5,119,502 | 6/1992 | Kallin et al. | 455/34.2 |
| 5,222,248 | 6/1993 | McDonald et al. | 455/33.2 |
| 5,345,500 | 9/1994 | Breeden et al. | 379/63 |
| 5,345,600 | 9/1994 | Davidson | 455/50.1 |

*Primary Examiner*—Reinhard J. Eisenzopf
*Assistant Examiner*—Lee Nguyen
*Attorney, Agent, or Firm*—John J. King

[57] ABSTRACT

A communication system has a PCC 101 which receives a data stream from a cordless base station 115. The cordless base station 115 transmits an indication in the data stream that it is going to begin a scan. While the cordless base station 115 is scanning, the PCC 101 performs a scan of its own. The PCC 101 also performs a scan when it determines that a message is a repeat and has been previously received.

18 Claims, 6 Drawing Sheets

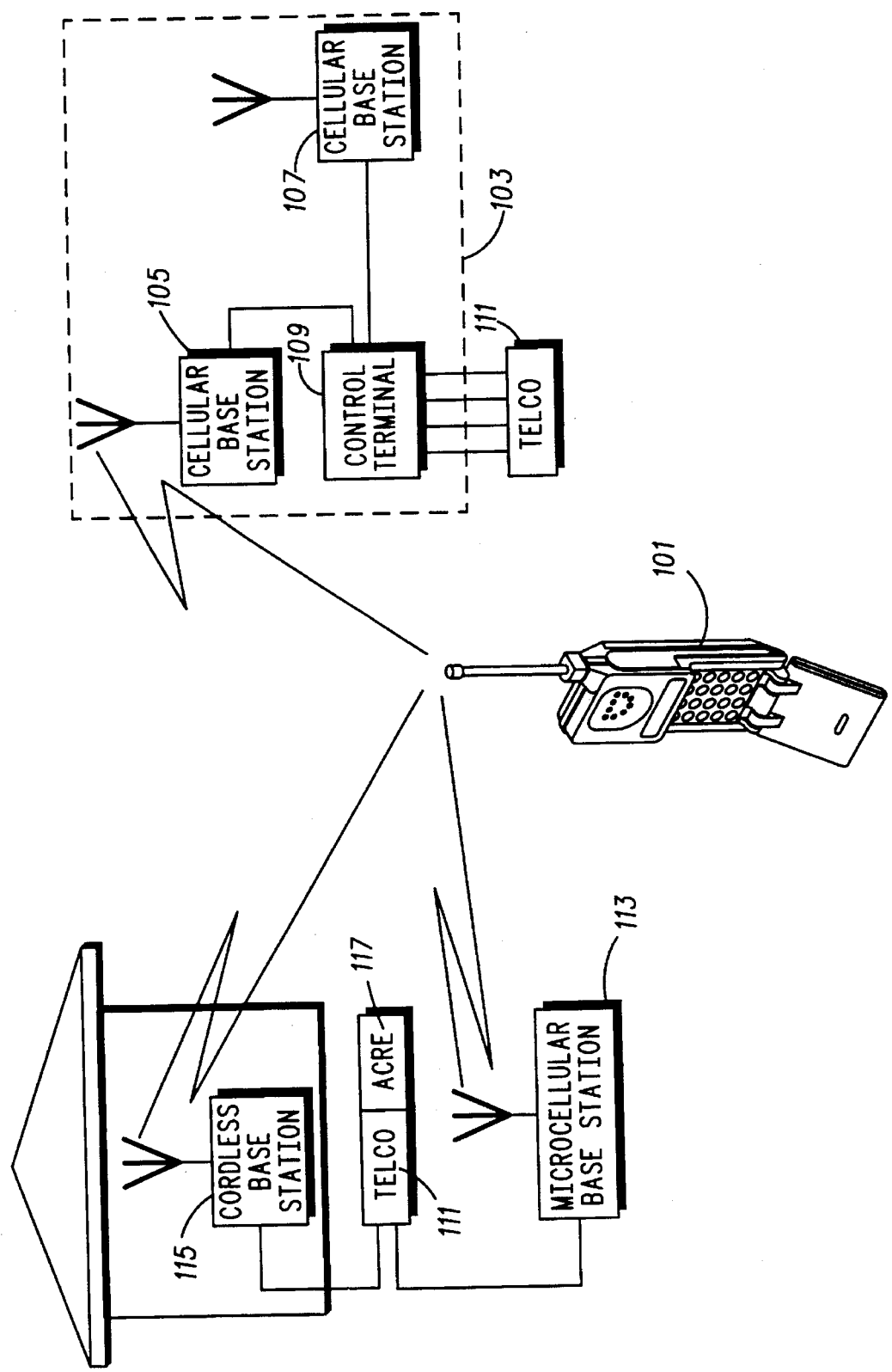

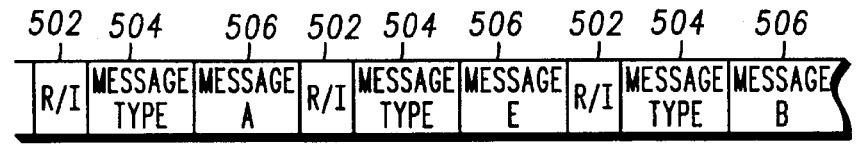
FIG. 7
FIG. 8
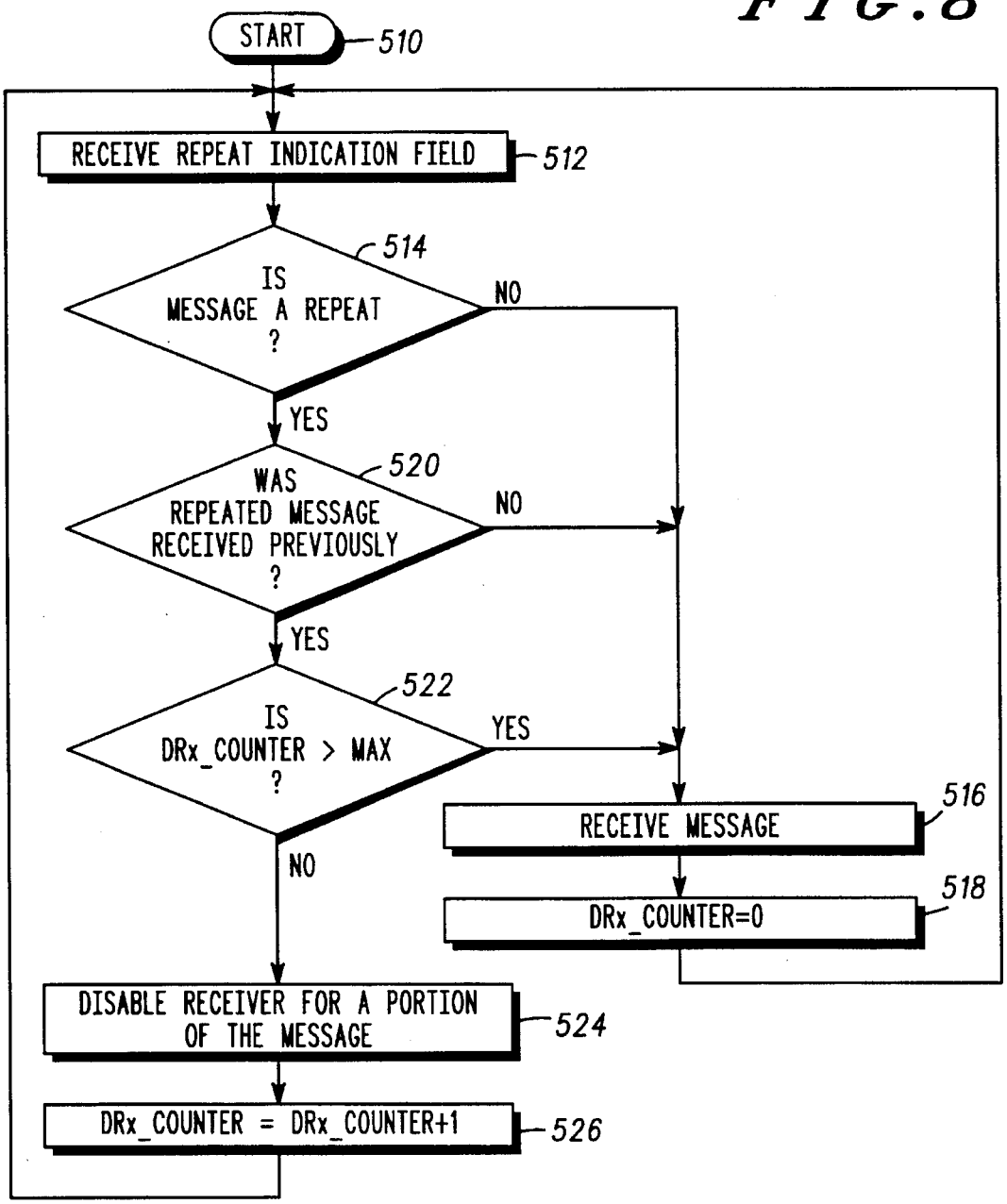

SYSTEM FOR SCANNING CHANNELS

FIELD OF THE INVENTION

The present invention relates generally to portable telephones, and more particularly to an improved portable telephone that operates in both cordless and cellular telephone systems.

BACKGROUND OF THE INVENTION

A cordless telephone system typically includes a portable cordless handset and a cordless base station connected to a telephone company phone system by telephone landlines. The cordless base station has an assigned landline telephone number that allows the user to place and receive calls using the cordless portable handset within a limited range of the cordless base station, such as in a home. However, due to their limited range, the cordless portable handset provides the user with relatively local radiotelephone communication.

Radiotelephone communication outside the range of the cordless telephone system may also be provided to the user via a cellular telephone system. A cellular telephone system typically includes cellular subscriber units (mobile or portable) and cellular base stations connected to the landline telephone system via one or more cellular switching networks. Each cellular subscriber unit has an assigned cellular telephone number that allows the user to place and receive calls within a widespread range of the cellular base stations, such as throughout a metropolitan area. However, the cost of using the cellular telephone service is much greater than the cordless telephone service.

A problem exists for the user that frequently relocates between the cordless and cellular telephone systems. An incoming call routed to the system where the user is not located may be missed. Thus there exists a need for a system that reroutes a user's telephone calls to the system where the user is located.

Additionally, a portable radiotelephone which transmits and receives calls in both a cellular and a cordless system should have the capability to select the clearest available channel for use. An automatic channel selection should minimize interference and eliminate the need for conventional frequency planning.

A problem exists in selecting a clear channel without losing data or adding cost to either the cordless base station or to the radiotelephone. Thus there exists a need for a system that can select a clear channel without losing data or adding cost to the cordless base station or the radiotelephone.

Additionally, any portable radio device that uses batteries can profit from a system to increase the time period between battery recharging times. Previous solutions in the cellular telephone system rely on messages being repeated for a majority vote error correcting. The radiotelephone turns off its receiver if it correctly decodes the first message or there are no errors in a majority vote of the first three transmissions of the message. The receiver remains off for the remaining repeats of the message. However, this solution requires the system to use majority vote error correcting. Thus there exists a need for a power saving system which does not rely on majority vote error correcting.

BRIEF DESCRIPTION OF THE DRAWINGS

FIG. 1 is a block diagram of an operating configuration for a portable radiotelephone in which several systems, including both a cellular system and a cordless system, may be accessed by the same portable radiotelephone.

FIG. 7 is a data format for a message stream.

FIG. 8 is a flow chart describing a process to determine if the radiotelephone of FIG. 5 can turn off its receiver.

DETAILED DESCRIPTION OF A PREFERRED EMBODIMENT

Figure 3:
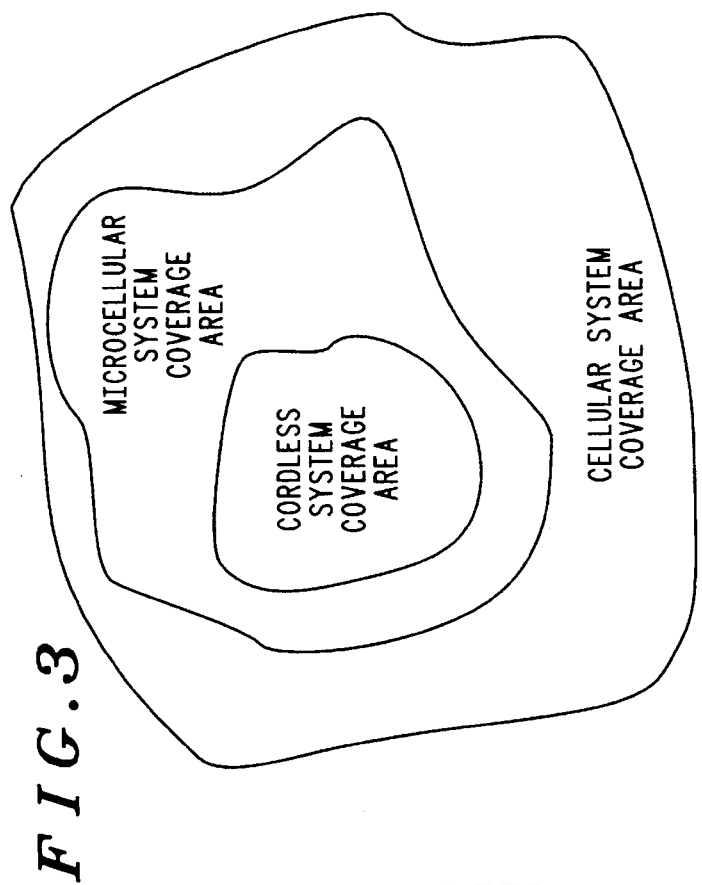
FIG. 3 is a diagrammatical map which shows a typical arrangement of coverage areas for the cordless, microcellular and cellular systems.

A generalized block diagram of an application of the present invention is shown in FIG. 1. A portable cellular cordless (PCC) radiotelephone 101 is shown having the ability to communicate with a conventional cellular radiotelephone system 103, which has a plurality of cellular base stations 105, 107 located at geographically separate locations but arranged to provide radiotelephone coverage over a wide geographic area. The cellular base stations are coupled to a control terminal 109 which provides coordination among the plurality of cellular base stations, including handoff of user cellular mobile and portable equipment, and provides call switching and interconnect to the public switched telephone network (identified hereinafter as "TELCO") 111.

The PCC 101 further has the capacity to communicate with a microcellular base station 113, which is a cellular adjunct cell having lower power and limited capabilities but providing public radiotelephone service to distinct areas such as shopping malls, airports, etc. The microcellular base station 113 is coupled to the TELCO 111 landline telephone system so that calls can be placed to the TELCO.

The PCC 101 further has the capability to communicate with and place radiotelephone calls via a cordless base station 115, which provides private telephone line interconnection to the TELCO 111 for the user of the PCC 101. The cordless communication system uses an authorization and call routing equipment (ACRE) 117 to provide call routing information to a telephone switching system. Thus, the switching system automatically routes phone calls between the cellular, microcellular and cordless systems. The ACRE 117 also authorizes the cordless base station 115 to utilize channels. The ACRE 117 can be part of the TELCO 111 or can be a stand alone device. As previously noted, the cordless base station 115 and the PCC 101 together provide the limited range radio service conventionally known as cordless telephone service. Such service has become pervasive, conventionally using a few radio frequency channels in the VHF (very high frequency) or UHF (ultra high frequency) radio bands.

The user of a radiotelephone should expect that radiotelephone service be available wherever he travels in the United States and that this service is provided at the lowest cost. It is also to be expected that radiotelephone service be provided in a portable unit that is as compact and inexpensive as possible. The PCC 101 is uniquely configured to meet this end. Furthermore, the cordless base station 115 is uniquely designed to provide telephone interconnect to the user's home telephone line when the user has the PCC 101 within the radio range of the cordless base station 115.

Figure 2:
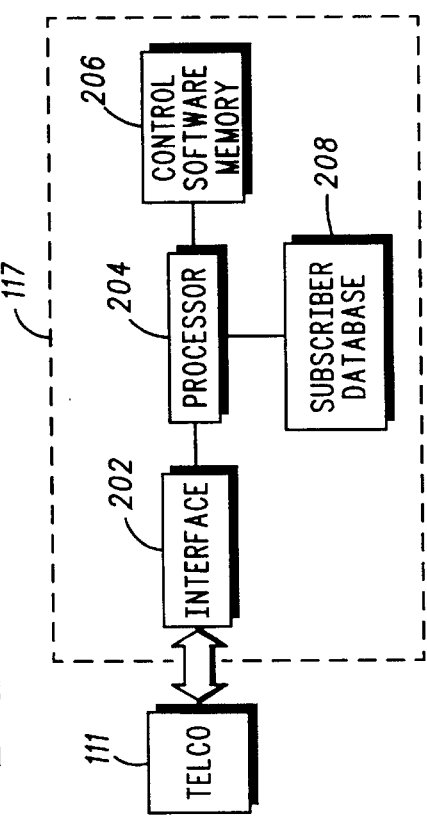
FIG. 2 is a block diagram of an authorization and call routing equipment (ACRE).

A block diagram of the ACRE 117 is shown in FIG. 2. The ACRE 117 is connected to a TELCO 111 by an interface 202. The interface 202 controls and formats messages between the TELCO 111 and a processor 104. The processor 204 in combination with a control software memory 206 is the intelligence of the ACRE 117 and performs authorization, and authentication tasks and provides call routing information. A subscriber database 208 contains the data required by the processor 204 in order to perform the tasks discussed above. The ACRE 117 can be separate from the TELCO 111 as shown in FIG. 2 or can be part of the TELCO 111, usually part of the switching equipment. When the ACRE 117 is part of the TELCO 111 the ACRE 117 may not need the interface 202. Additionally, the functions of the ACRE may be performed by existing equipment at the TELCO.

FIG. 3 shows a typical arrangement of coverage areas for the cordless, microcellular and cellular systems. The cordless system coverage area is the smallest and resides within the microcellular system. The microcellular system has intermediate coverage and resides within the cellular system. The coverage area of each system may depend upon but is not limited to the number of base stations in each system, antenna height of each base station and the power level used by each system. The user of the portable radiotelephone may relocate between the various coverage areas. The portable radiotelephone may change between systems based on but not limited to portable radiotelephone location, system availability, and user preference.

The coverage areas of the systems are not limited to the particular arrangement as shown in FIG. 3. A coverage area may be independent of another coverage area or may partially overlap one or more other coverage areas.

The cordless base station 115, conceptually, is a subminiature cellular system providing a single signaling channel which transmits outbound data messages in a fashion analogous to a conventional cellular outbound signaling channel, and receives service requests from a remote unit, such as a PCC 101. Proper service requests are granted with an assignment of a voice channel (made via the control channel) on the same or a second radio frequency to which the PCC 101 is instructed to tune for its telephone call.

Figure 4:
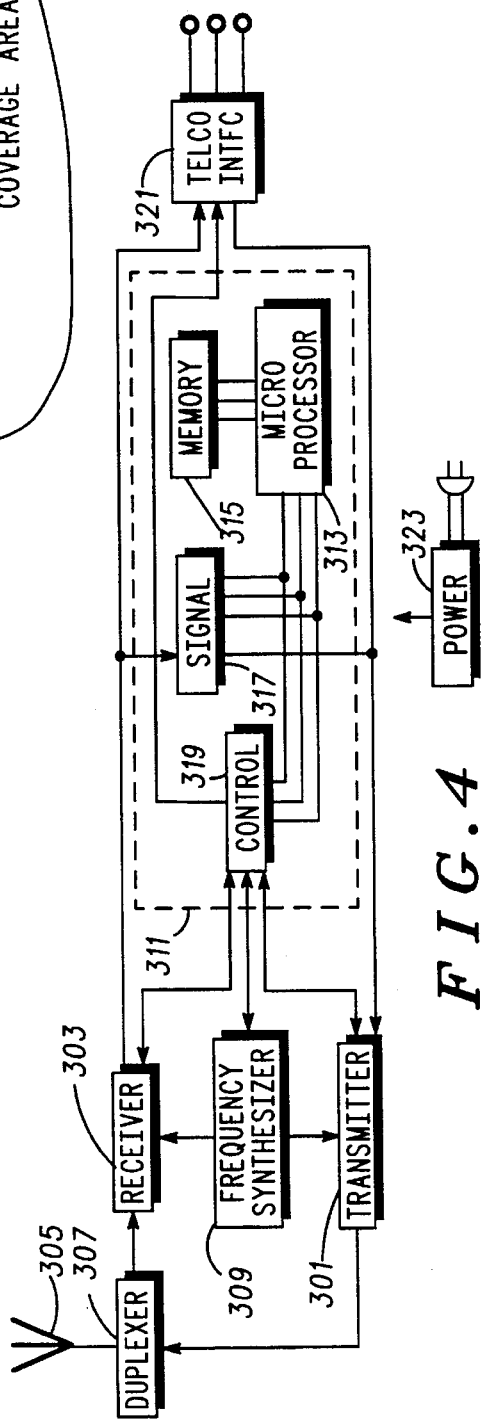
FIG. 4 is a block diagram of a cordless base station which may employ the present invention.

The basic implementation of a cordless base station is shown in FIG. 4. A conventional transmitter 301 and a conventional receiver 303 suitable for use in the 869 to 894 MHz and 824 to 849 MHz band of frequencies, respectively, being used for conventional cellular services, are coupled to a common antenna 305 via a duplexer 307. The power output of the transmitter 301 is limited to approximately 6 milliwatts so that interference to other services and other cordless telephone stations is minimized. The channel frequency selection is implemented by a frequency synthesizer 309 controlled by a logic unit 311. Within the logic unit 311 is a microprocessor 313, such as a 68HC11 available from Motorola, Inc., or similar microprocessor, which is coupled to conventional memory devices 315 which store the microprocessor operating program, base identification (BID) and customizing personality, and other features. Received and transmitted data is encoded/decoded and coupled between the receiver 303, the transmitter 301, and the microprocessor 313 by signaling interface hardware 317. The microprocessor instructions are conveyed and implemented by control hardware 319. Interface with the user's home landline telephone line is conventionally accomplished via a TELCO interface 321. Power is supplied from the conventional AC mains and backed-up with a battery reserve (all depicted as power 323).

Figure 5:
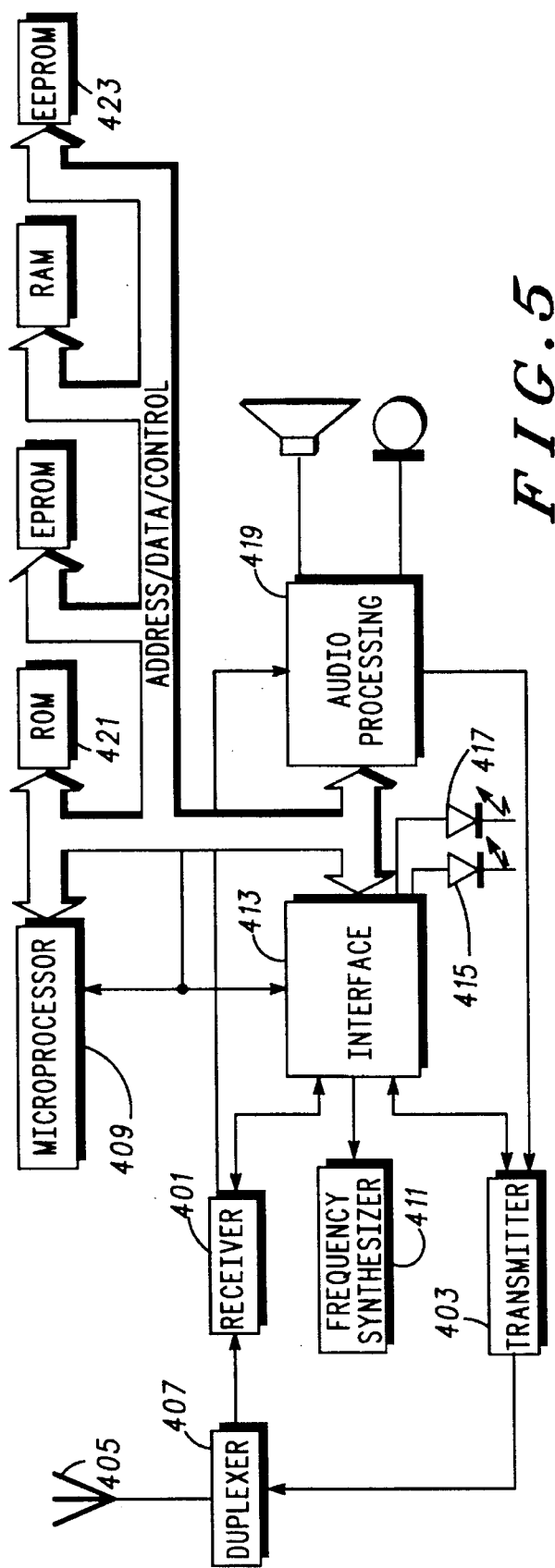
FIG. 5 is a block diagram of a portable radiotelephone which may employ the present invention.

The PCC 101 is a portable radiotelephone transceiver which is shown in block diagram form in FIG. 5. A portable radio receiver 401, capable of receiving the band of frequencies between 869 and 894 MHz, and a portable transmitter 403, capable of transmitting with low power (approximately 6 milliwatts in the preferred embodiment) on frequencies between 824 and 849 MHz, are coupled to the antenna 405 of the PCC 101 by way of a duplexer 407. The particular channel of radio frequency to be used by the transmitter 403 and the receiver 401 is determined by the microprocessor 409 and conveyed to the frequency synthesizer 411 via the interface circuit 413. Data signals received by the receiver 401 are decoded and coupled to the microprocessor 409 by the interface circuit 413 and data signals to be transmitted by the transmitter 403 are generated by the microprocessor 409 and formatted by the interface 413 before being transmitted by the transmitter 403. Operational status of the transmitter 403 and the receiver 401 is enabled or disabled by the interface 413. The interface also controls light emitting diodes, 415 and 417, which are used to indicate to the user which system the PCC 101 is currently receiving. Control of user audio, the microphone output and the speaker input, is controlled by audio processing circuitry 419.

In the preferred embodiment, the microprocessor 409 is a 68HC11 microprocessor, available from Motorola, Inc., and performs the necessary processing functions under control of programs stored in conventional ROM 421. Characterizing features of the PCC 101 are stored in EEPROM 423 (which may also be stored in the microprocessor, on-board EEPROM) and include the number assignment (NAM) required for operation in a conventional cellular system and the base identification (BID) required for operation with the user's own cordless base.

The transmitter 403 of the PCC 101 has the capability of transmitting with the full range of output power which is required for operation in a conventional cellular system. This range of output power consists of six sets of output power magnitude ranging from a high output power level of approximately 600 milliwatts to a low output power level of 6 milliwatts. This six set range of output power is enabled when the PCC 101 is in the cellular system mode.

According to the preferred embodiment of the present invention, the same PCC 101 is compatible with both the cordless and cellular telephone system 103. This is accomplished by enabling the PCC 101 to operate in both a cordless and cellular telephone system 103 using only cellular telephone frequencies.

The radiotelephone arrangement has desirable advantages for the user. The PCC 101, in combination with the cordless base station 115, can automatically route, via the ACRE 117, an incoming call to the telephone system in which the PCC 101 is located without inconveniencing the user. The TELCO 111, in combination with the ACRE 117, can automatically route an incoming call to the PCC 101 without inconveniencing the user.

Figure 6:
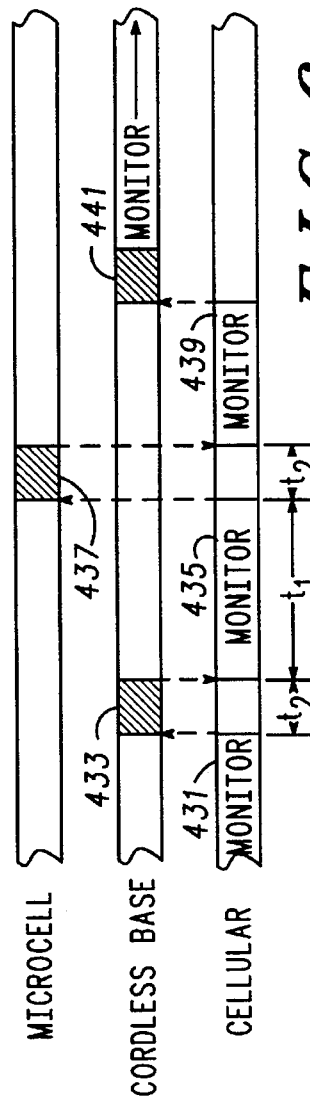
FIG. 6 is a timing diagram of the system scanning process which may be employed in the portable radiotelephone of FIG. 5.

The priority established for the PCC 101 is that the cordless base station 115 is the first desired path for a user's telephone call and the conventional cellular (or the microcell system) is the second choice, the process of implementing that priority is shown in FIG. 6. The depiction in FIG. 6 is of the PCC receiver's 401 reception of the outbound signaling channel or set of signaling channels transmitted from the cellular system, the cordless base, and the microcellular system relative to time. This diagram aids in the understanding of the unique scanning priority feature of the present invention.

The PCC receiver 401 can be monitoring 431 the outbound message stream being transmitted from the cellular system signaling channel (which was selected from among the plurality of cellular signaling channels in conventional fashion). At the appropriate time, the PCC receiver 401 is instructed by its microprocessor 409 to tune to the frequency or one of the frequencies being used by the cordless base station 115 as a signaling channel. The PCC receiver 401 scans 433 the cordless base outbound signaling channel or channels for a period of time $t_2$. If the signaling data stream is not received with sufficient quality, the PCC receiver 401 is returned to the previously selected signaling channel of the cellular system 103. It remains tuned to this signaling channel 435 for a period of time, $t_1$, before attempting another scan of a signaling channel of one of the alternative systems. The relationship of $t_1$ and $t_2$ is such that a cellular page message (that is, a radiotelephone call or other transmitted requirement) which is repeated, conventionally, after a 5 second pause will not be missed because the PCC receiver 401 was scanning an alternative system during both cellular page message transmission times. The time $t_1$ must be greater than the sum of the pause between the two pages and the typical time to transmit two pages. The time $t_2$ must be less than the time between the two pages. If the pause time is 5 seconds and the typical time to transmit a page is 185.2 milliseconds, $t_1$ must be greater than the 5.3704 seconds and $t_2$ must be less than 5 seconds. After monitoring the cellular system signaling channel for a time $t_1$, the PCC receiver 401 may be instructed to tune to the signaling channel or to the signaling channels, sequentially, of the microcell system, as shown at 437. If an adequate microcell signaling channel is not found during the scan of predetermined signaling channel frequencies, the PCC receiver 401 retunes to the cellular system signaling channel, as shown at 439.

A scan to the signaling channels, 441, of the cordless base station 115 which discovers a signaling data stream meeting appropriate quality requirements results in the PCC receiver 401 continuing to monitor the cordless signaling channel. The PCC receiver 401 remains on the cordless signaling channel without rescanning to another system until the PCC 101 cannot receive the cordless base's transmitted signal for a continuous 5 second period of time.

The effect of this priority process is to give priority to the cordless base station 115 at the PCC 101. Once the signaling channel of the cordless base station 115 is discovered, the PCC 101 remains tuned to this channel. Thus, when the PCC 101 is initially tuned to the cellular system it will automatically switch to the cordless base station when it is possible to access the cordless base station. Once the PCC receiver 401 has found the cordless base signaling channel, it remains tuned to that channel. When the PCC transceiver is first turned on, its first scan of signaling channels is the reestablished signaling channel or channels of the cordless base station 115. Of course, the user may override the automatic priority scanning hierarchy by entering an override code into the PCC 101. In this manner, the user may force the scanning of the cellular system signaling channels only, the cordless base signaling channels only, the microcellular system signaling channels only, or combinations of the systems. The user may also perform a call origination with a one time override to the system of his choice.

Once the signaling channel of a system is being monitored, a visual indication is given to the PCC transceiver user. In the preferred embodiment, this indicator is a set of light emitting diodes (LEDs) 415, 417, one of which uniquely illuminates to indicate to which system the PCC transceiver is tuned. Other indicators may alternately be used to convey the same information. For example, a system identifier may appear in the number display of the PCC 101, or a flashing symbol (having different rates of flashing) may be used. Nevertheless, this indication enables the user to determine which system he is in and decide whether he wishes to complete a radiotelephone call in the indicated system.

The PCC 101 is a battery operated radiotelephone. All battery operated radio communication devices are concerned with saving power to lengthen the time between battery recharging. The PCC 101, like all cordless and cellular telephones, spends a majority of its time monitoring for incoming calls. Many of the messages received by the PCC 101 during this period are repetitive. If the PCC 101 could detect which messages are repeats it could choose to not receive those messages and turn off receiver 401 and the frequency synthesizer 411 during the repeated message, thus saving the power that would of otherwise been spent to receive the repeated message.

A simplified diagram of the message format used in the dual use radiotelephone system is shown in FIG. 7. The message format has a repeat indication (R/I) 502, a message type (MSG TYPE) 504, followed by the message (MSG) 506. The repeat indication 502 and the message type 504 are sometimes grouped together as the repeat indication field 508. The message type sequence does not follow a predetermined rotation so a type "E" message does not always follow a type "A" message.

A process for determining if a message is a repeat of an earlier received message is shown in FIG. 8. The process begins at block 510, and the repeat indication field is received, at block 512. In block 514 it is determined if the repeat indication 502 indicates the message will be a repeat. If the message is not a repeat, at block 514, the message is received, at block 516. A counter, which counts the number of messages which have not been received because they were repeats, is set to zero, at block 518, and the process starts over.

If the message is a repeat at block 514, it is determined if the message has been previously received, at block 520. One way of determining this is for the PCC 101 to store a list of all message types which have been previously received. If the message type field 504 matches a message type in the list the message has been previously received. If the message has not been previously received processing continues at block 516.

If the message was previously received at block 520 the counter (DRx_counter) is tested, at block 522, to determine if it is greater than a limit, max. If the limit has been exceeded then processing continues at block 516. If the limit was not exceeded in block 522 then the receiver is disabled for a portion of the message, at block 524. The counter is incremented at block 526 and then processing starts over for the next message.

Figure 9:
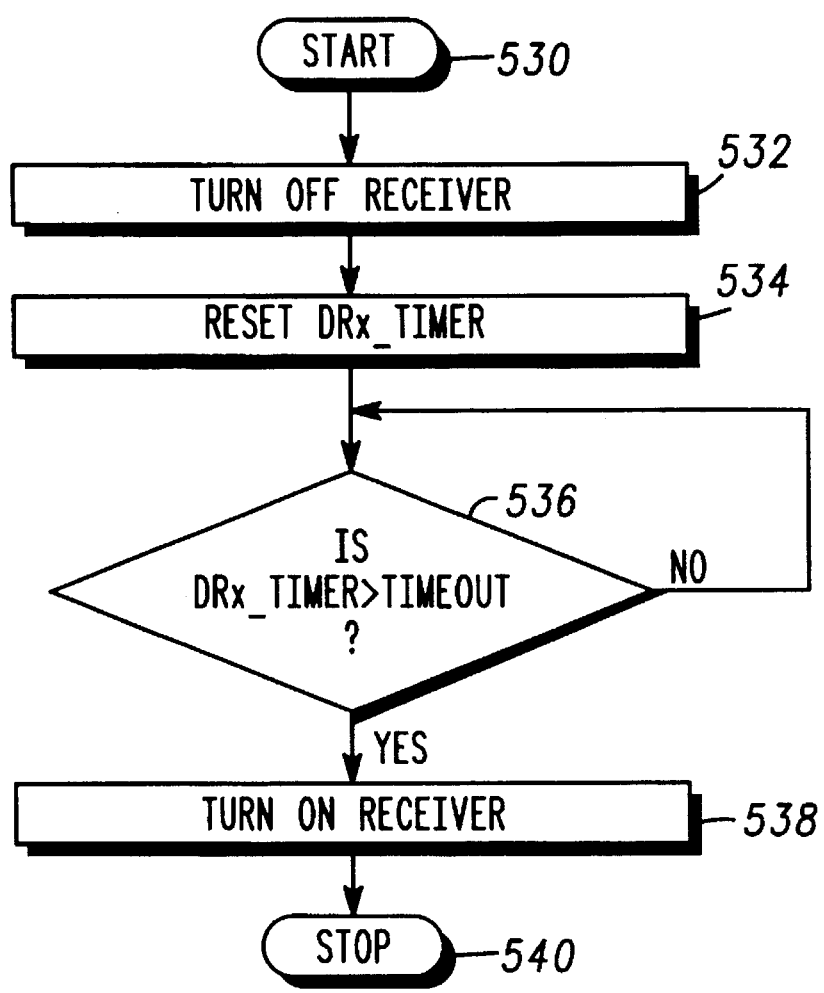
FIG. 9 is a flow chart describing the process to determine when to turn on the radiotelephone's receiver.

FIG. 9 show a flow chart for controlling the time the receiver is turned off at block 524 of FIG. 8. The process begins at block 530, and the receiver is turned off at block 532. A timer (DRx_timer) is reset at block 534. Then the timer is tested at block 536 until the timer is greater than a predetermined value, timeout. Once the timeout has been exceeded the receiver is turned on at block 538, which ends the process at block 540.

In order to select a channel for use, the available channels must be examined. This process is sometimes called "scanning". This examination determines whether the channel is in use by another device and optionally determines the type of device which is utilizing this channel. One way of determining if a channel is available for service is by measuring signal strength. An alternate method is by measuring bit error rate.

In order to build a low cost cordless telephone system, this measurement is preferrably done in both the PCC 101 and the cordless base station 115. Alternately it could be done exclusively in the PCC 101 or the cordless base station 115.

A difficulty in utilizing the PCC 101 to perform this measurement is that it has a single reciever 401. When the PCC receiver 401 is examining channels, it cannot receive information which is being transmitted by the transmitter 301 of the cordless base station 115. Consequently, the PCC 101 might miss important information which is being transmitted by the cordless base station 115. One solution to this problem is to add a second receiver to the PCC 101. However, this adds considerable cost to the PCC 101.

A difficulty in utilizing the cordless base station 115 to perform this measurement is that the transmitter 301 and receiver 303 of the cordless base station 115 in the preferred embodiment are designed such that the receiver 303 can only receive communication on the channel on which the cordless base station 115 is transmitting. This is because a single frequency synthesizer 309 is coupled to both the receiver 303 and the transmitter 301. Consequently, in order for the cordless base station 115 to examine channels, it must change the channel on which its transmitter 301 is operating. This has the undesirable effect of causing the PCC 101 to think that it can't receive a signal transmitted by the cordless base station 115. This might cause the PCC 101 to search for other services such as cellular or microcellular service. One solution to this problem is to implement the cordless base station 115 with two frequency synthesizers. One of the frequency synthesizers would be coupled to the transmitter 301 and the other frequency synthesizer would be coupled to the receiver 303. Both frequency synthesizers would be connected to the control means 319. The disadvantage to this approach is that it increases the cost of the cordless base station 115.

Accordingly, there is a need for an improved channel examination mechanism.

Figure 10:
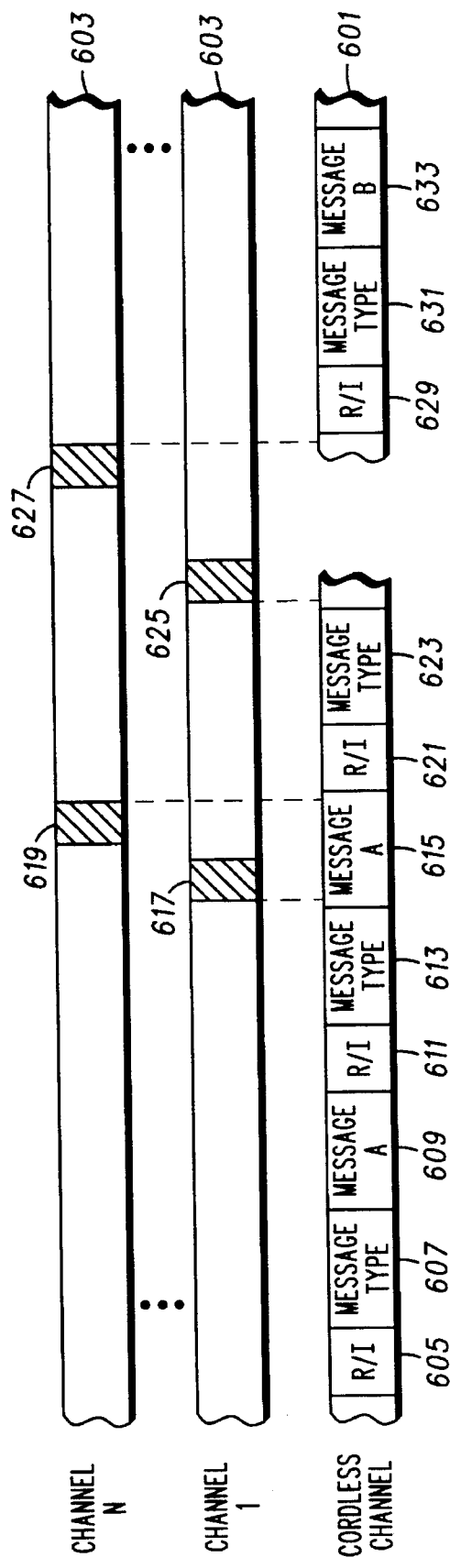
FIG. 10 shows a message stream for a cordless channel.

FIG. 10 shows a timing diagram of the transmitted information on multiple channels. One of these channels 601 is being utilized by the cordless base station 115 for transmission of information to the PCC 101. Several other channels 603 are channels which can be examined for potential use by the cordless system.

The channel being utilized by the cordless base station 115 for transmission of information contains a stream of information. Generally speaking, this stream contains a continuous stream of data including a repeat indication field (R/I) 605 followed by a message type field 607 followed by a message data 609. The stream continuously repeats this sequence. The R/I field 605 indicates whether the message data which follows is a repeated transmission or a new transmission. The message type field 607 indicates which message is being transmitted. The message data field 609 contains a particular message for example MSG-A.

A PCC 101 receiving the the data stream transmitted on the cordless channel first receives the repeat indication field 605 which indicates that the message is a new transmission. Since it is a new transmission it receives the message type field 607 which indicates that MSG-A is contained in the message data 609 which follows. The PCC receives MSG-A 609 and remembers that it received this message. Then the PCC 101 receives the repeat indication field 611 which indicates that the message data that follows is a repeat. The message type field 613 is then received. This message type field indicates that the subsequent message data contains MSG-A. At this point the PCC 101 determines that MSG-A 615 is a repeated transmission since it received the original transmission of MSG-A 609 and the repeat indication, field 611 indicates that this instance of message A is a repeat. Accordingly the PCC does not need to receive MSG-A 615 and can use the reception time for MSG-A 615 for other purposes.

In particular, the PCC 101 can utilizes the reception time to examine one or more other channels as shown in 617 and 619. One reason to examine other channels is to determine the best channel for use in communication. It might also examine other channels to find other types of services which may be available. Possible other services include but are not limited to cellular service, microcellular service, or data services such as a paging system. Additionally, the PCC 101 might scan for another cordless base station 115.

After scanning the desired channels, the PCC 101 returns to monitoring the cordless channel. The PCC may return at the start of the next repeat indication field 621 or slightly before the start of the next repeat indication field 621 to allow time for the receiver to settle. Then the PCC 101 receives the repeat indication field 621.

Another time where scanning can occur is now shown. The PCC 101 receives the message type 623 which contains a value indicating that the cordless base station is going to scan other channels during the time where the message data field would normally be located. The cordless base station 115 scans one or more channels as depicted in 625 and 627 and returns to transmitting the repeat indication field 629 at a predetermined time. In the preferred embodiment, this would be the time that is required to send message data since the communication system is preferrably a synchronous transmission system. This invention could also be performed in an asynchronous transmission system. The cordless base station 115 may enable its transmitter slightly before transmitting the next repeat indication field 629 to allow the PCC receiver time to settle. The PCC 101 ignores the cordless channel during the time where transmission is not ocurring.

The transmission stream then continues with the next repeat indication field 629, the message type field, 631, and the next message data field, 633, which contains MSG-B.

Instead of ignoring the cordless channel during the time where transmission is not occurring, the PCC 101 can also examine one or more channels as depicted at 625 and 627. The PCC would return its receiver 303 to the cordless channel slightly before the next repeat indication field 629. As in a previous case, this examination of channels could be utilized for determining the best channel or channels for communication or could be utilized for finding services.

The PCC 101 could utilize the data which it found in examining channels to pick the best channel or it could transmit this information to the cordless base station 115. Likewise, the cordless base station 115 could utilize the data which it found in found in examining channels to pick the best channel or it could transmit this information to the PCC 101.

Although these channel examining methods are described for a cordless communication system, they could also be utilized in cellular communication systems or in other communication systems. Utilization of these channel examining messages in any system is considered within the scope of this invention.

Figure 11:
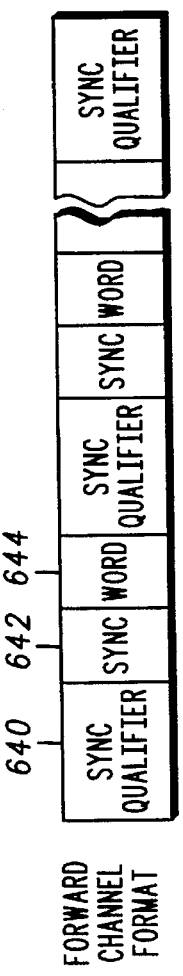
FIG. 11 shows a message protocol.

FIG. 11 shows a picture of the message stream in the preferred embodiment. This synchronous message transmission format contains a syncronnization qualifier field 640 followed by a synchronization field 642 followed by a word 644. These three fields are continuously repeated. The sync field 642 is utilized by the PCC 101 to synchronize its receiver. The preferred embodiment allows two different values for the sync field. These values are the inverses of each other. One value, 10110100110010011001, indicates that an identification word follows, the other value, 01001011001101100110, indicates that a call processing word follows. The sync qualifier field 640 indicates that the subsequent word contains a new transmission, that the subsequent word contains a repeat, or that the cordless base station 115 will scan during the time that the word data would normally be transmitted. If the sync qualifier field indicates that the word contains a repeated transmission, the value in the sync qualifier field also indicates which word is being repeated. Thus the sync qualifier field 640 is very similar to the combination of a message type 607 and a repeat indication 605 as shown in FIG. 10.

In a synchronous transmission system a message is usually comprised of one or more words. Thus the message fields 609, 615, and 633 of FIG. 10 could also be called a word. Likewise, in FIG. 7, the messages 506 could also be called a word. For purposes of the scanning methods described above and the power saving reciever method described above the terms word and message can be utilized interchangably.

A radiotelephone and system for allowing the radiotelephone to operate in the cellular, microcellular or cordless communication systems has been described. The PCC 101 receives a data stream from a cordless base station 115. The cordless base station 115 transmits an indication in the data stream that it is going to begin a scan. While the cordless base station 115 is scanning, the PCC 101 performs a scan of its own. The PCC 101 also performs a scan when it determines that a message is a repeat and has been previously received.

To those skilled in the art it is obvious that many modifications can be made to the invention without departing from the spirit of the invention. For instance, the ACRE 117 can be performed by several pieces of equipment, which could be located separately from each other. Or the authorization function and equipment could be separate from the call routing equipment and function. Any such modifications are considered to be part of the inventor's exclusive rights in this invention. For a full understanding of the scope of the invention reference should be made to the appended claims.

I claim:

1. A communication system for communicating a data stream, said communication system comprising:

a receiving device having a processing means and a receiving means, said receiving means having the capability of receiving on a plurality of channels;

a transmitting device for transmitting a data stream which contains messages which can be repeated;

said receiving means receiving a data stream and said processing means determining if;
  (i) the next message is a repeat of a previous message; and
  (ii) the previous message was received; and said receiving means examining a channel other than the channel over which said previous message was received if said next message is a repeat of a previous message and the previous message was received.

2. The communication system of claim 1 wherein the receiving device receives the next message if it is not a repeat of a previous message.

3. The communication system of claim 1 wherein the receiving device receives the next message if said previous message has not been received.

4. The communication system of claim 1 wherein the data stream contains a repeat indication which the processing means uses to determine if the next message is a repeat of a previous message.

5. The communication system of claim 4 wherein the repeat indication is a field in the data stream.

6. The communication system of claim 5 wherein the repeat indication field further includes a message type field and the processing means determines if the previous message having the same message type was received.

7. The communication system of claim 5 wherein the processing means counts the number of successive repeat indication fields that are true and if that count exceeds a predetermined number, receiving the message.

8. The communication system of claim 4 wherein the repeat indication is a position in the data stream.

9. A communication system comprising:

a base station including a processor, a transmitter and a receiver, said base station transmitting a data stream on a channel;

said processor directing the base station to;
  (i) transmit a scan indicator;
  (ii) terminate said data stream after transmitting the scan indicator;
  (iii) examine a channel other than the data stream channel after terminating said data stream; and
  (iv) resume said data stream on said data stream channel after a predetermined period of time.

10. The communication system of claim 9 further including a radiotelephone, said radiotelephone receiving said data stream.

11. The communication system of claim 10 wherein the radiotelephone receives said scan indicator, after receiving said scan indicator the radiotelephone scans a channel other than the data stream channel and returns to the data stream channel after a predetermined period of time.

12. A method of communicating a data stream in a communication system comprising a receiving device having a processing means and a receiving means, said receiving means having the capability of receiving on a plurality of channels and a transmitting device for transmitting a data stream which contains messages which can be repeated, said method comprising the steps of:

receiving at said receiving means said data stream and said processing means determining if:
  (i) the next message is a repeat of a previous message, and
  (ii) the previous message was received; and examining by said receiving means a channel other than the channel over which said previous message was received if said next message is a repeat of a previous message and the previous message was received.

13. The method of claim 12 further including a step of receiving at said receiving device the next message if the next message is not a repeat of a previous message.

14. The method of claim 12 further including a step of receiving at said receiving device the next message if said previous message has not been received.

15. The method of claim 12 wherein said step of receiving at said receiving means the data stream comprises receiving a repeat indication which the processing means uses to determine if the next message is a repeat of a previous message.

16. The method of claim 15 wherein said step of receiving at said receiving device the repeat indication field further comprises receiving a message type field.

17. The method of claim 16 further comprising a step of determining if the previous message having the same message type was received.

18. The method of claim 15 further comprising a step of counting the number of successive repeat indication fields that are true and if that count exceeds a predetermined number, receiving the message.

* * * * *

UNITED STATES PATENT AND TRADEMARK OFFICE
CERTIFICATE OF CORRECTION

PATENT NO. : 5,574,976
DATED : November 12, 1996
INVENTOR(S) : Schellinger et al.

It is certified that error appears in the above-indentified patent and that said Letters Patent is hereby corrected as shown below:

On the title page item [75],

Please insert "Robert F. D'Avello, Lake Zurich, Ill.", after "Vernon Hills," and insert --both of-- before "Ill."

Signed and Sealed this

Sixteenth Day of December, 1997

*Attest:*

BRUCE LEHMAN

*Attesting Officer*     *Commissioner of Patents and Trademarks*